United States Patent [19]
Fukaya et al.

[11] Patent Number: 5,775,740
[45] Date of Patent: Jul. 7, 1998

[54] STRUCTURE AND PROCESS FOR JOINTING SMALL-DIAMETER THIN METAL TUBE AND PRESSURE RUBBER HOSE

[75] Inventors: Kazumi Fukaya; Tsuyoshi Aoki, both of Mishima, Japan

[73] Assignee: Usui Kokusai Sangyo Kaisha Limited, Japan

[21] Appl. No.: 746,561

[22] Filed: Nov. 13, 1996

[30] Foreign Application Priority Data

Nov. 16, 1995 [JP] Japan ................... 7-322240

[51] Int. Cl.⁶ ............................................. F16L 33/20
[52] U.S. Cl. .................... 285/256; 285/258; 285/328; 285/906
[58] Field of Search ................. 285/258, 256, 285/259, 328, 906

[56] References Cited

U.S. PATENT DOCUMENTS

| | | | |
|---|---|---|---|
| 4,124,232 | 11/1978 | Ahlstone | 285/328 X |
| 4,212,487 | 7/1980 | Jones et al. | 285/259 X |
| 5,207,460 | 5/1993 | Oetika | 285/258 |
| 5,387,016 | 2/1995 | Joseph et al. | 285/256 X |

FOREIGN PATENT DOCUMENTS 5-180380 7/1993 Japan .
575057 1/1946 United Kingdom ................... 285/258

*Primary Examiner*—Dave W. Arola
*Attorney, Agent, or Firm*—Anthony J. Casella; Gerald E. Hespos; Ludomir A. Budzyn

[57] ABSTRACT

A joint structure for jointing a small-diameter thin metal tube and a pressure rubber hose, comprising: a joint portion having a joint end portion of a metal tube, which is given a double wall by fitting a short inner tube therein, and having a plurality of annular comb-tooth faces formed at least in the metal tube at the double wall in the vicinity of the joint end portion; and a bottomed cylindrical socket member having its bottom wall portion retained on the side of the metal tube and caulking and fixing the overlapping portions of the metal tube and the pressure rubber being fitted on the joint portion. A joint process for jointing a small-diameter thin metal tube and a pressure rubber hose, comprising: the step of fitting or press-fitting a short inner tube in a metal tube in the vicinity of a joint end portion thereby to form a double wall; the step of plastic-working the vicinity of the joint end portion over the double wall radially inward from the outside to form a plurality of annular comb-tooth faces at least at the side of the metal tube thereby to form a joint portion; the step of retaining the bottom wall portion of a bottomed cylindrical socket member fitted on the pressure rubber hose at the joint portion, at the portion at the back of the comb-tooth faces; and the step of caulking and fixing the overlapping portions.

16 Claims, 8 Drawing Sheets

STRUCTURE AND PROCESS FOR JOINTING SMALL-DIAMETER THIN METAL TUBE AND PRESSURE RUBBER HOSE

BACKGROUND OF THE INVENTION

1. Field of the Invention

The present invention relates generally to structure and process for jointing a relatively small-diameter thin metal tube of a diameter of about 20 mm or less, as arranged as a passage for feeding oil or air to automobiles or various machines or apparatus, and a pressure rubber hose, as covered with a braided armor of fine metal lines.

2. Description of the Prior Art

In the joint structure and process of this kind of the prior art, generally speaking, there is used a nipple member (11) which is soldered (as indicated by W) to the end portion of a metal tube ($P_{11}$), as shown in FIG. 17. A pressure rubber hose (12) is fitted on the saw-tooth wall portion (11'), as formed by cutting the leading end side of the nipple member (11) in the vicinity of a joint end portion. The metal tube ($P_{11}$) and the pressure rubber hose (12) are jointed by caulking the covering portion of the rubber hose in the vicinity of the joint end portion by means of a cylindrical socket member (13) which is arranged on the rubber hose while having its rear end portion retained on the nipple member (11). Incidentally, reference numeral (12') designates a braided armor of fine metal lines covering the pressure rubber hose (12).

In this prior art, however, the use of the additional member of the nipple member (11), as cut from a thick material, and the soldering (W) at the end portion of the metal tube ($P_{11}$) are obliged to invite working and operating troubles thereby to lower the productivity. Moreover, the soldered portion is frequently caused to invite leakages by its uncertainty. At the same time, due to the deterioration of the mechanical properties, as caused by the overheat coming from the inexperienced works, problems of cracks or breaks are invited in the vicinity of the soldered portion of the metal tube ($P_{11}$) by an additional cause of the arrangement under oscillations.

SUMMARY OF THE INVENTION

The present invention has been conceived in view of the above-specified problems of the prior art and has an object to provide joint structure and process for jointing a small-diameter thin metal tube and a pressure rubber hose, in which a joint portion can be remarkably simply formed at the metal tube with an improved productivity while eliminating the nipple member and its soldering work, and in which the rigidity of the joint portion can be enhanced by the hardening work associated with the formation of comb-tooth faces by the rolling or pressing work so that the joint portion can be made so sufficiently thin as to lighten the joint structure in its entirety.

In order to achieve the above-specified object, according to a first mode of embodiment, there is provided a joint structure for jointing a small-diameter thin metal tube and a pressure rubber hose, which comprises: a joint portion having a joint end portion of a metal tube, which is given a double wall by fitting a short inner tube therein, and having a plurality of annular comb-tooth faces formed at least in the metal tube at the double wall in the vicinity of the joint end portion; and a bottomed cylindrical socket member having its bottom wall portion retained on the side of the metal tube and caulking and fixing the overlapping portions of the metal tube and the pressure rubber being fitted on the joint portion. Moreover, the joint portion of the metal tube is radially left as it is or expanded. The comb-tooth faces are formed into a plurality of annular bulging walls, corrugated walls or saw-tooth walls at a predetermined interval. The end face portions of the metal tube and the inner tube are fixed in advance at least at one side to each other before forming the comb-tooth faces after the inner tube is fitted. The metal tube and the inner tube are made of different materials or given different thicknesses. The comb-tooth faces of the metal tube are formed at least partially into rectangular recesses or ridges. The annular groove of the metal tube for retaining the bottom wall portion of the socket member is formed into an rectangular recess. The comb-tooth faces of the metal tube are roughed at their recesses or ridges or in their entirety.

According to a second mode of embodiment of the present invention, there is provided a joint process for jointing a small-diameter thin metal tube and a pressure rubber hose, which process comprises: the step of fitting or press-fitting a short inner tube in a metal tube in the vicinity of a joint end portion thereby to form a double wall; the step of plastic-working the vicinity of the joint end portion over the double wall radially inward from the outside to form a plurality of annular comb-tooth faces at least at the side of the metal tube thereby to form a joint portion; the step of retaining the bottom wall portion of a bottomed cylindrical socket member fitted on the pressure rubber hose at the joint portion, at the portion at the back of the comb-tooth faces; and the step of caulking and fixing the overlapping portions. Moreover, there is also provided a joint process for jointing a small-diameter thin metal tube and a pressure rubber hose, which comprises: the step of fitting or press-fitting a short inner tube, as formed in advance on its outer circumference with a plurality of annular recesses at a predetermined interval, in a metal tube in the vicinity of a joint end portion thereby to form a double wall; the step of fixing at least the leading end portions of the overlapping faces over the double wall and plastic-working the vicinity of the joint end portion over the double wall radially inward from the outside to form a plurality of annular comb-tooth faces, as held at a predetermined interval and positioned in the recesses extending over the metal tube and the inner tube, at the side of the metal tube thereby to form a joint portion; the step of retaining the bottom wall portion of a bottomed cylindrical socket member fitted on the pressure rubber hose at the joint portion, at the portion at the back of the comb-tooth faces; and the step of caulking and fixing the overlapping portions. Moreover, the annular comb-tooth faces are formed by the rolling or pressing work from the outside.

Thanks to the construction specified above, according to the present invention, the joint portion over the metal pipe or the short inner tube can be simply formed by the plastic working such as the rolling or pressing work either by the double wall at the joint portion or by the annular comb-tooth faces of at least the metal tube at the double wall portion, thereby to eliminate the working troubles to improve the productivity remarkably. At the same time, the rigidity at the joint portion can be enhanced by the hardening associated with the formation of the comb-tooth faces so that the joint portion can be so sufficiently made of the relatively thin structure as to lighten the entire joint structure.

DETAILED DESCRIPTION OF PREFERRED EMBODIMENTS

Figure 1:
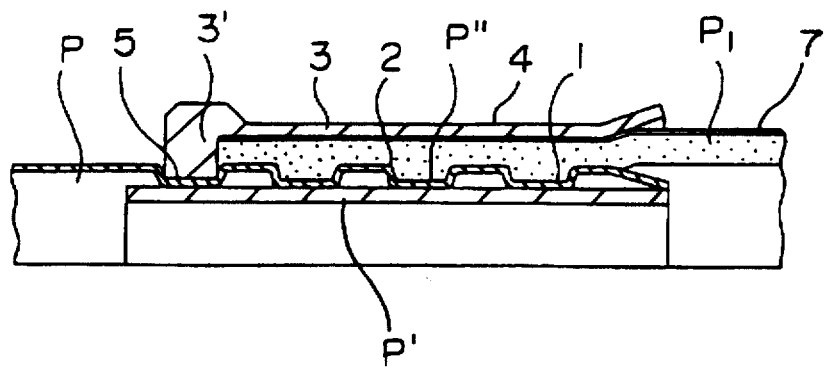
FIG. 1 is an enlarged section showing one half of a joint structure between a small-diameter thin metal tube and a pressure rubber hose according to one embodiment of the present invention.
Figure 2:
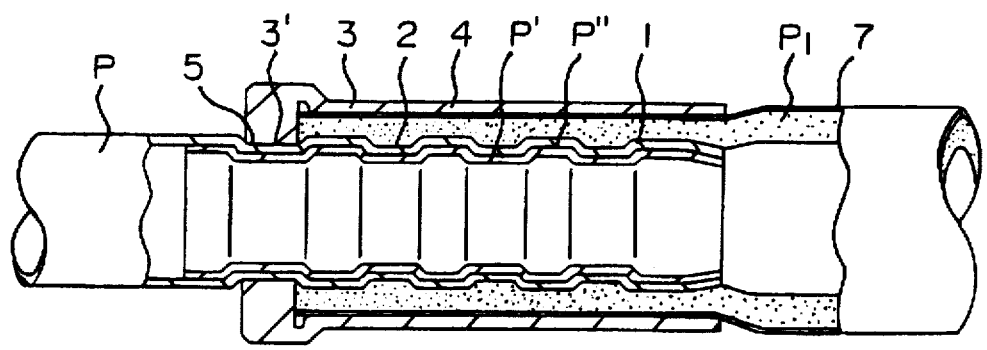
FIG. 2 is a partially cut-away, enlarged section showing a joint structure between a small-diameter thin metal tube and a pressure rubber hose according to another embodiment of the present invention.
Figure 3:
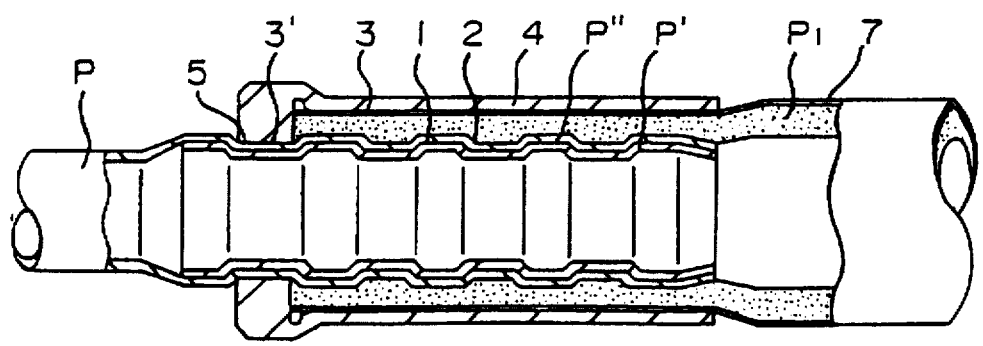
FIG. 3 is similar to FIG. 2 but shows still another embodiment.
Figure 4:
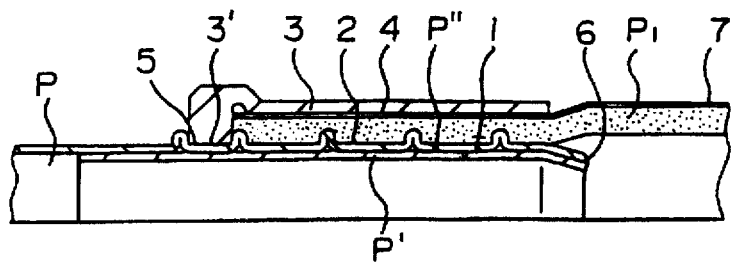
FIG. 4 is an enlarged section showing one half of a joint structure according a further embodiment.
Figure 5:
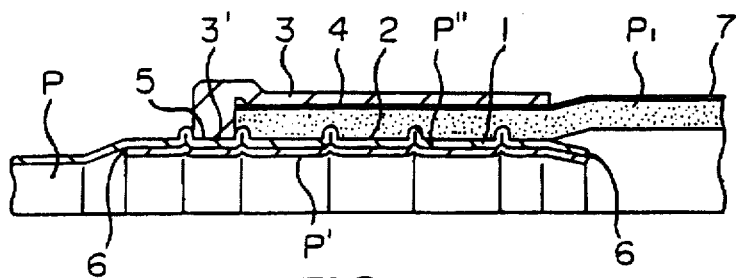
FIG. 5 is similar to FIG. 4 but shows a further embodiment.
Figure 6:
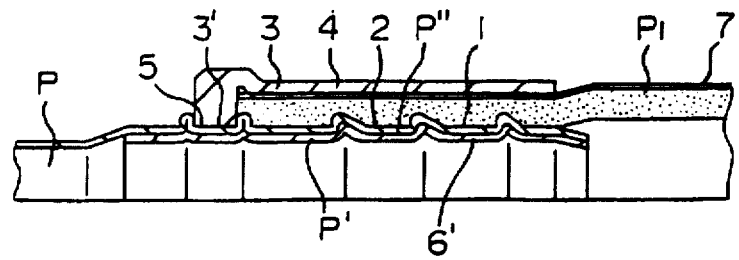
FIG. 6 is similar to FIG. 4 but shows a further embodiment.

The present invention will be described in the following in connection with its embodiments with reference to the accompanying drawings. In FIGS. 1 to 16, reference numeral (1) designates a joint portion of a metal tube (P) in the vicinity of the joint end portion. A short inner tube (P') is inserted, press-fitted, shrinkage-fitted or cold-fitted in the joint portion (1) so that it is fitted or press-fitted therein to form a double wall portion (P"). Moreover, the metal tube (P) at the double wall portion (P"), as shown in FIG. 1, or the metal tube (P) or the joint portion (1) extending to the short inner tube (P'), as shown in FIGS. 2 to 13, is plastic-worked radially inward from the outside by a roll or a press mold to form a plurality of annular comb-tooth faces (2). These comb-tooth faces (2) may be exemplified either by forming annular corrugating walls or bulging walls at a predetermined interval only in the metal tube (P), as shown in FIGS. 1 and 4, or annular bulging walls or saw-tooth walls at a predetermined interval in the metal tube (P) and the inner tube (P'), as shown in FIGS. 5 and 6.

Incidentally, the metal tube (P) may be either given an equal thickness all over the joint portion (1) or thinned at the comb-tooth faces (2) by the cutting work, the plastic work, the press work or the forging work.

If necessary, moreover, the metal tube (P) and the inner tube (P') can be prevented from moving out of position relative to each other either by fixing (as indicated by 6) one of the end face portions of the metal tube (P) and the inner tube (P'), as shown in FIG. 4, or both of the end face portions of the inner tube (P'), as shown in FIG. 5, in advance before forming the comb-tooth faces (2) after the inner tube (P') has been fitted, or by fixing (as indicated by 6') the entire overlapping faces of the double wall (P") by the soldering work. In order to facilitate insertion of the later-described pressure rubber hose, still moreover, the leading end portions can be formed into a taper shape by means of a punch.

Into the aforementioned joint portion (1), there is then inserted the pressure rubber hose ($P_1$) which is coated with a braided armor (7) of thin metal lines. In this state, a bottomed cylindrical socket member (3), the bottom wall portion (3') of which is retained in an annular groove (5) at the side of the aforementioned metal tube (P), is caulked radially inward from the circumferential outside, to fix (as indicated by 4) and joint the mutually overlapping portions.

On the other hand, both the materials for the metal tube (P) and the inner tube (P') are generally iron group metals but can be suitably selected. In order to improve the rigidity for the caulking fixture (4), for example, the metal tube (P) is made of a soft metal such as copper or aluminum, and the inner tube (P') is made of an iron group metal. In order to prevent the damage of the metal tube (P) by the deformation of the inner tube (P') at the time of the caulking fixture (4), on the contrary, the inner tube (P') can be made of a soft metal such as copper or aluminum, and the metal tube (P) can be made of an iron group metal. Likewise, the inner tube (P') and the metal tube (P) can be given different thicknesses for the object.

If the material and thickness of the inner tube (P') are made harder and larger than those of the metal tube (P), as described above, the inner tube (P') acts as the mandrel for the rolling work or the pressing work. As a result, the comb-tooth faces (2) of the metal tube (P) can be formed at least partially into rectangular recesses, bulges or corrugations having no large radius of curvature. Moreover, the annular groove 5 for retaining the bottom wall portion (3') of the bottomed cylindrical socket member (3) can also be formed into a rectangular recess nor having a large radius of curvature.

Figure 9:
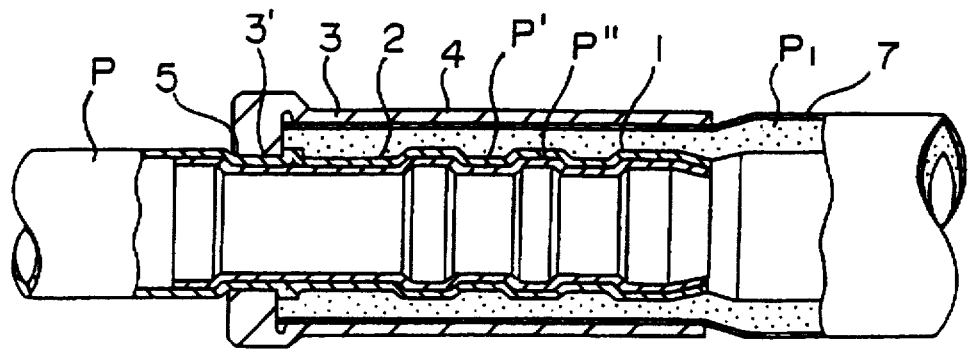
FIG. 9 is similar to FIG. 1 but shows a further embodiment.
Figure 10:
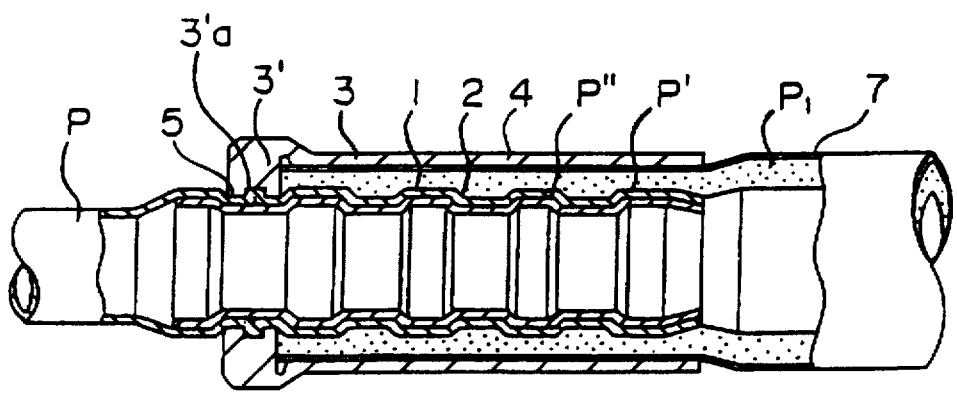
FIG. 10 is similar to FIG. 1 but shows a further embodiment.
Figure 11:
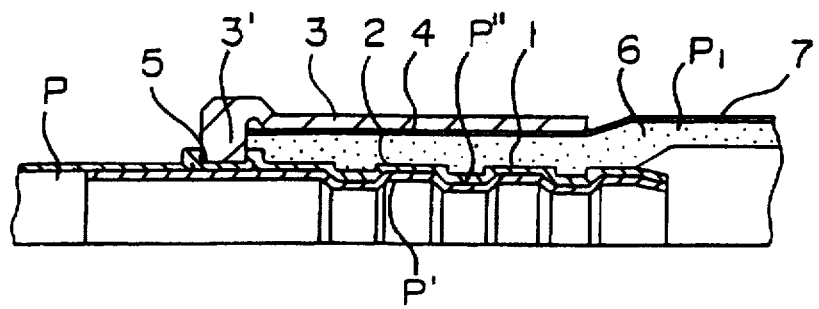
FIG. 11 is similar to FIG. 4 but shows a further embodiment.
Figure 12:
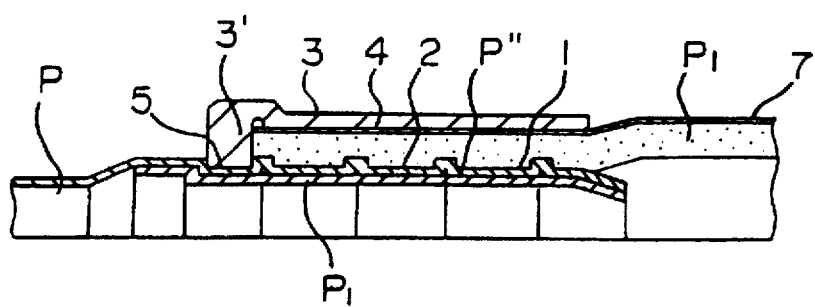
FIG. 12 is similar to FIG. 4 but shows a further embodiment.
Figure 13:
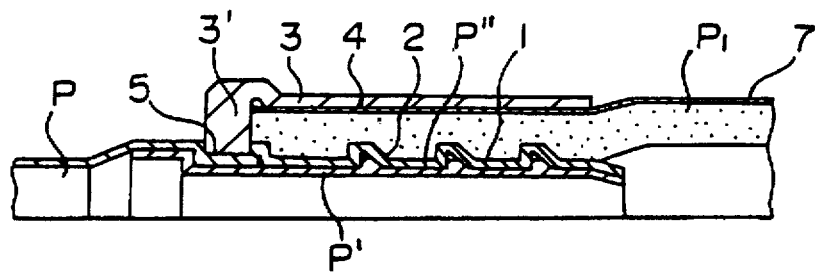
FIG. 13 is similar to FIG. 4 but shows a further embodiment.

The embodiments disclosing these constructions will be described with reference to FIGS. 9 to 13. In the embodiment of FIG. 9, the recess of the annular groove (5) for retaining the bottom wall portion (3') of the socket member (3) is formed into a rectangular shape to enhance the joint strength. In the next example of FIG. 10, an annular groove (3'a) having a square section is formed in the inner circumference of the bottom wall portion (3') of the socket member (3), and one of the comb-tooth faces (2), as formed into a rectangular ridge, is fitted and retained in the annular groove (3'a). In the embodiment of FIG. 11, moreover, a plurality of (or three, as shown) comb-tooth faces (2) are formed into rectangular recesses to enhance the force for retaining the pressure rubber hose ($P_1$). In the embodiments of FIGS. 12 and 13, furthermore, the annular groove (5) for retaining the bottom wall portion (3') of the socket member (3) is formed into a rectangular recess, and either bulges (of FIG. 12), as formed of a plurality of (or three, as shown) bulging walls, or bulges (of FIG. 13), as formed of comb-tooth walls, are formed into rectangular shapes to enhance the force for holding the pressure rubber hose ($P_1$).

If desired, moreover, the joint portion (1), as made of the aforementioned metal tube (P), may be left at its original diameter, as shown in FIGS. 1, 2, 4, 7, 9 and 11, or may be slightly bulged by the punch, as shown in FIGS. 3, 5, 6, 10, 12 and 13. In this case, the effective area of the passage is not decreased to increase no flow resistance.

Figure 8:
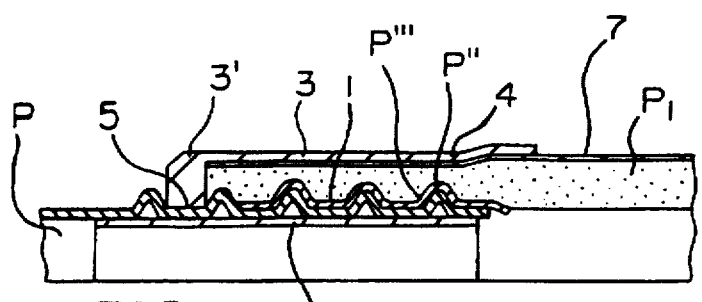
FIG. 8 is similar to FIG. 4 but shows a further embodiment.

If desired, moreover, an outer tube (P''') can be fitted on the double wall portion (P''), as formed by inserted by fitting or press-fitting the inner tube (P'), as shown in FIG. 8, to enhance the rigidity of the joint portion (1).

Incidentally, a finely coarse face having a roughness of about 0.1 mm or less may be formed either in the whole face of the outer tube (P'''), as fitted on the outer side of the comb-tooth faces (2) of the metal tube (P) or the double wall portion (P''), or in a portion of the recesses or bulges of the comb-tooth faces (2) at the rolling work time, for example, by using a roll having a finely coarse face on its outer circumference. Then, the retaining force of the pressure rubber hose ($P_1$) is improved so much as to make it difficult together with the caulking fixture (4) for the pressure rubber hose to come out. This effect is prominent especially in case the pressure rubber hose has a slippy coating of a fluororesin, for example.

With reference to FIG. 14, here will be described a process for jointing a small-diameter thin metal tube and a pressure rubber hose in accordance with one embodiment of the present invention.

Figure 7:
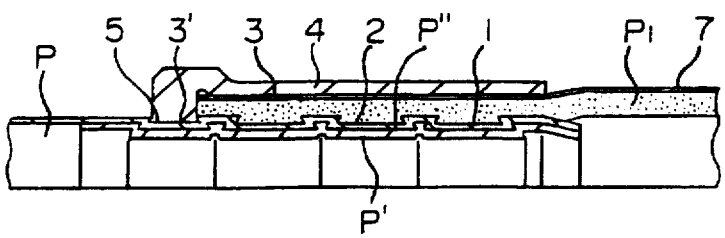
FIG. 7 is similar to FIG. 4 but shows a further embodiment.
Figure 14A:
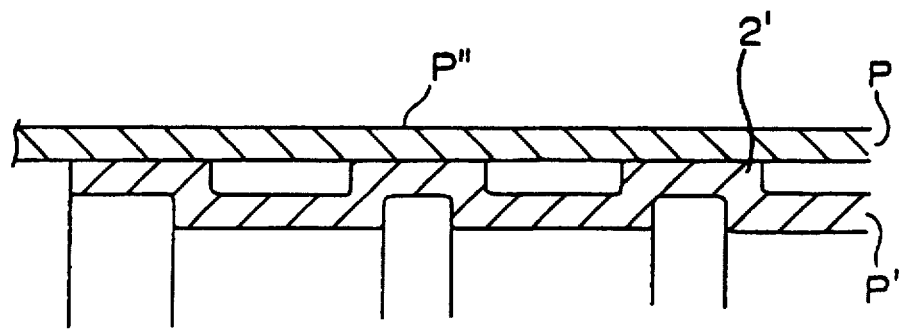
FIGS. 14(a) to 14(c) are diagrams sequentially showing the steps of a process for jointing a small-diameter thin metal tube and a pressure rubber hose in accordance with one embodiment of the present invention.
Figure 14B:
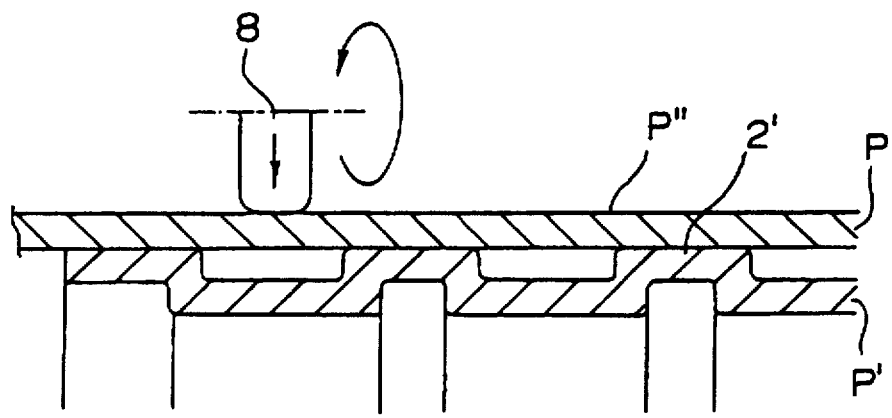
Figure 14C:
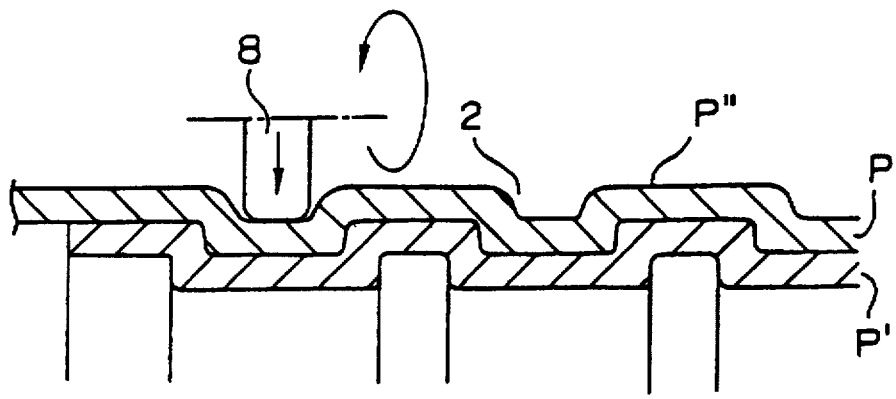

In this embodiment, the inner tube (P'), as having annular corrugations (2') formed in advance at a predetermined interval, is inserted and fitted (as shown in FIG. 14(a)) in the metal tube (P) in the vicinity of the joint end portion. Next, a roll (8) is brought into abutment (as shown in FIG. 14(b)) against the outer circumference of the metal tube (P), as corresponds to the recessed wall portions of the annular corrugations of the inner tube (P'), and is rolled radially inward from the outside to press the double wall (P'') thereby to form the comb-tooth faces (2) (as shown in FIG. 14(c)). Incidentally, an axial pressing work may be added when the comb-tooth faces (2) are to be formed, as shown in FIG. 7.

Next, another embodiment of the jointing process will be described with reference to FIG. 15.

Figure 15A:
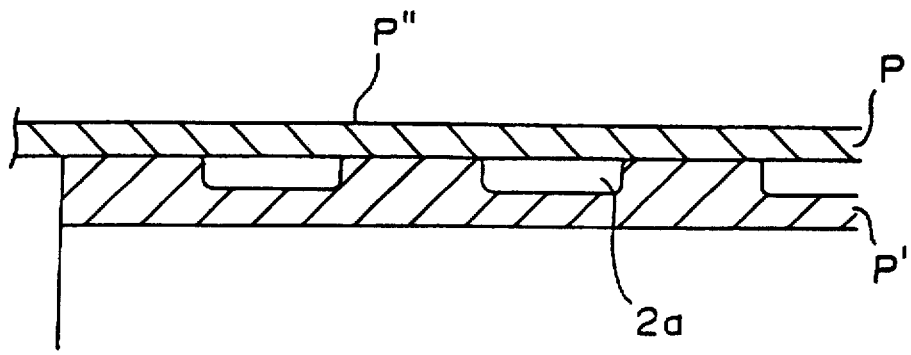
FIGS. 15(a) to 15(c) are diagrams sequentially showing the steps of a process for jointing a small-diameter thin metal tube and a pressure rubber hose in accordance with another embodiment of the present invention.
Figure 15B:
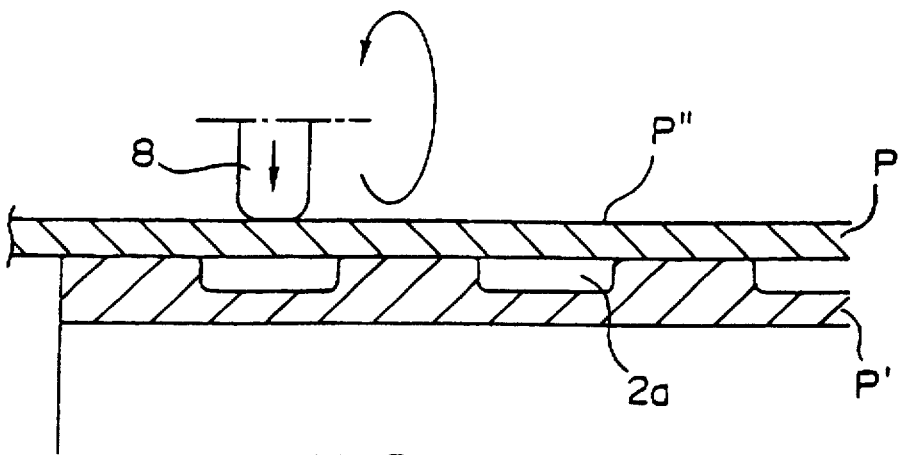
Figure 15C:
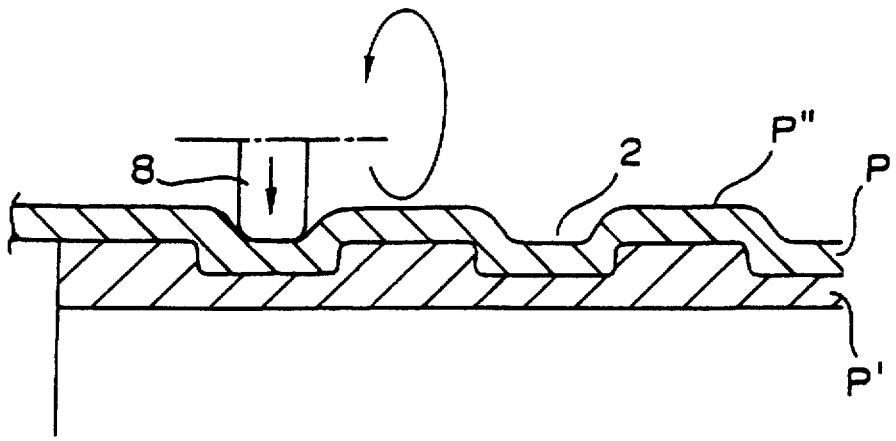

In this embodiment, the inner tube (P') is cut at its outer circumference to form annular grooves (2a) in advance. The inner tube thus prepared is inserted and fitted (as shown in FIG. 15(a)) in the metal tube (P) in the vicinity of the joint end portion. Next, a roll (8) is brought into abutment (as shown in FIG. 15(b)) into the outer circumference of the metal tube (P), as corresponds to the annular groove (2a) of the inner tube (P'), and is rolled radially inward from the outside to press the double wall (P'') thereby to form the comb-tooth faces (2) (as shown in FIG. 15(c)).

By selecting whether the inner tube (P') is to be made harder or thicker than the metal tube (P) in the joint processes of FIGS. 14 and 15, the inner tube (P') is enabled to act as the mandrel so that the comb-tooth faces (2) of the metal tube (P) can be formed at least partially into rectangular bulges, recesses or both having no large radius of curvature, and so that the annular groove (5) for retaining the bottom wall portion (3') of the bottomed cylindrical socket member (3) can also be formed into a rectangular recess nor having a large radius of curvature.

Still another joint process will be described with reference to FIG. 16.

Figure 16A:
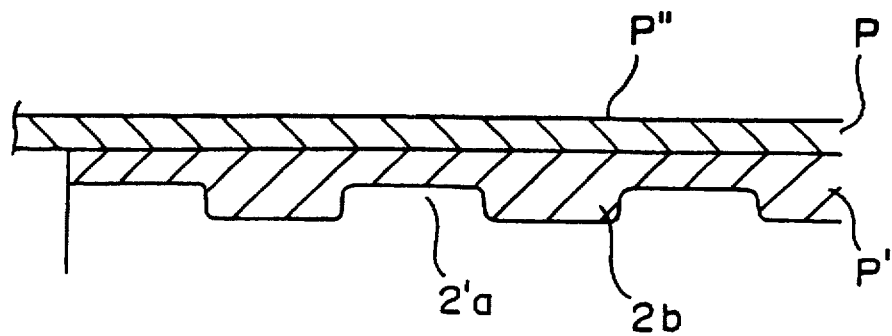
FIGS. 16(a) to 16(c) are diagrams sequentially showing the steps of a process for jointing a small-diameter thin metal tube and a pressure rubber hose in accordance with still another embodiment of the present invention.
Figure 16B:
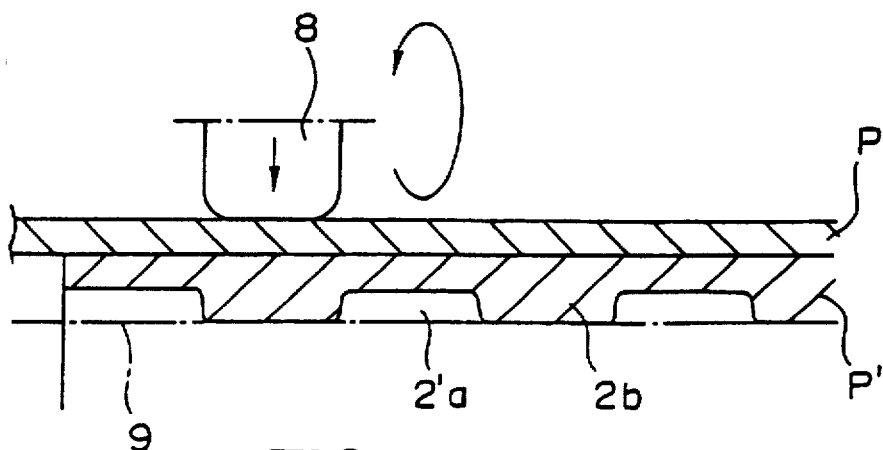
Figure 16C:
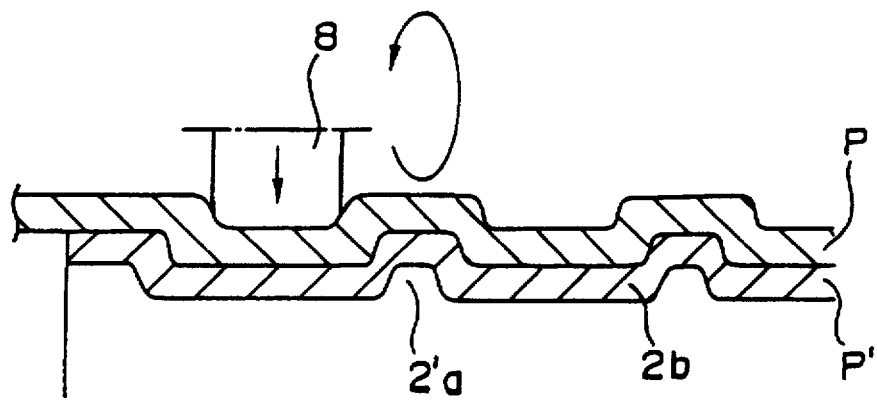
Figure 17:
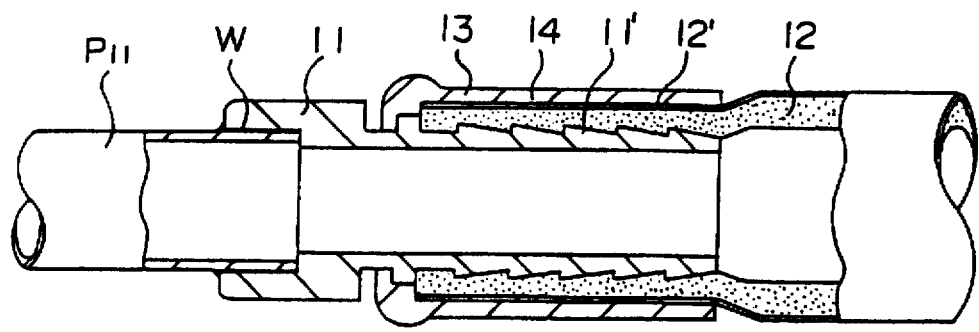
FIG. 17 is a partially cut-away section showing a joint structure of one example of the prior art.

In this embodiment, the inner tube (P') is cut in advance at its inner circumference to form annular groove (2'a) at a predetermined interval while leaving annular ridges (2b) at a predetermined interval and is press-fitted (as shown in FIG. 16(a)) in the metal tube (P) in the vicinity of the joint end portion. Next, the roll (8) is brought into abutment (as shown in FIG. 16(b)) against the outer circumference of the metal tube (P), as corresponds to the annular ridge (2b) of the inner tube (P'). The metal tube (P) and the inner tube (P') are turned together while being pressed by the roll (8) so that the thick portion of the double wall (P''), as composed of the metal tube (P) and the inner tube (P'), is subjected to a plastic flow to form the comb-tooth faces (2) (as shown in FIG. 16(c)). In this embodiment, it is preferable to insert a mandrel (9) into the inner tube (P') at the time of the plastic flow, as shown in FIG. 16(b)).

If the outer circumference of the roll (8) to be used in the joint processes of FIGS. 14 to 16 is finely roughed in advance, the outer circumference of the metal tube (P) can be formed with a finely rough face for improving the force for retaining the pressure rubber hose ($P_1$), while forming the comb-tooth faces (2) on the outer circumference of the metal tube (P).

According to the joint structure and process of the present invention for jointing the small-diameter thin metal tube and the pressure rubber hose thus far described, the joint portion (1) can be simply made by the structures of the double wall (P'') of the joint portion (1) and the comb-tooth faces (2), as formed by the elastic work at the double wall portion (P'') at least at the side of the metal tube (P). This simplicity can eliminate the working troubles to improve the productivity remarkably. At the same time, the rigidity of the joint portion (1) can be enhanced by the hardening of the comb-tooth faces (2) so that the joint portion (1) can be sufficiently made of the relatively thin structure thereby to lighten the entire joint structure. If the outer tube (P'''), as fitted on the comb-tooth faces (2) or the double wall portion (P'') of the metal tube (P), is roughed as fine as a depth of about 0.1 mm or less all over its surface or partially only in the recesses or bulges, the force for retaining the pressure rubber hose ($P_1$) is improved so that the pressure rubber hose is made reluctant to come out together with the caulking fixture (4). Thus, the present invention can provide remarkably useful joint structure and process for jointing the small-diameter thin metal tube and the pressure rubber hose.

What is claimed is:

1. A joint structure for joining a small-diameter thin metal tube and a pressure-resistant rubber hose, said joint structure comprising: a small-diameter thin metal tube having a joint end portion; a short inner tube fitted in said joint end portion of said metal tube to define a double wall portion, a plurality of annular deformations formed at least in said metal tube at said double wall portion; a pressure-resistant rubber hose surrounding at least one of said annular deformations; and a socket member having a bottom wall caulked inwardly and retained on at least a second of the annular deformations of said metal tube in said double wall portion and a cylindrical side wall disposed in overlapping relationship with portions of said pressure-resistant rubber hose surrounding said metal tube, said cylindrical side wall of said socket member being caulked inwardly such that said pressure-resistant rubber hose is deformed and fitted on said at least one annular deformation of said double wall portion.

2. A joint structure according to claim 1, wherein the joint end portion of said metal tube is radially expanded.

3. A joint structure according to claim 2, wherein said annular deformations are formed into a plurality of annular corrugated walls at a predetermined interval.

4. A joint structure according to claim 2, wherein said metal tube and said inner tube are made of materials with different characteristics.

5. A joint structure according to claim 2, further comprising an outer tube fitted on said double wall.

6. A joint structure according to claim 2, wherein the annular deformation of said metal tube are at least partly rectilinear.

7. A joint structure according to claim 2, wherein an annular groove of said metal tube for retaining the bottom wall portion of said socket member is formed into a rectangular recess.

8. A joint structure according to claim 2, wherein the annular deformation of said metal tube are roughed.

9. A joint structure according to claim 1, wherein said annular deformations are defined by forming at least said metal tube to have a configuration selected from the group consisting of a plurality of annular bulging walls, corrugated walls and saw tooth walls at predetermined intervals.

10. A joint structure according to claim 1, wherein end face portions of said metal tube and said inner tube are fixed to each other at least at one side before forming said annular deformations and after said inner tube is fitted.

11. A joint structure according to claim 1, wherein said metal tube and said inner tube are made of materials with different characteristics.

12. A joint structure according to claim 1, further comprising an outer tube fitted on said double wall portion.

13. A joint structure according to claim 12, wherein the outer circumference of said outer tube is roughed all over its surface.

14. A joint structure according to claim 1, wherein the annular deformations of said metal tube are at least partly rectilinear.

15. A joint structure according to claim 1, wherein an annular groove of said metal tube for retaining the bottom wall portion of said socket member is formed into a rectangular recess.

16. A joint structure according to claim 1, wherein the annular deformations of said metal tube are roughed.

* * * * *